United States Patent
Taylor et al.

(10) Patent No.: US 10,301,432 B2
(45) Date of Patent: May 28, 2019

(54) POLYARYLENE ETHER SULFONES

(71) Applicant: SOLVAY SPECIALTY POLYMERS USA, LLC., Alpharetta, GA (US)

(72) Inventors: Narmandakh Taylor, Cumming, GA (US); Charles R. Hoppin, Alpharetta, GA (US); Ahmed Khan, Alpharetta, GA (US); Henry Bradley, Roswell, GA (US); Suresh R. Sriram, Aurora, IL (US)

(73) Assignee: SOLVAY SPECIALTY POLYMERS USA, LLC., Alpharetta, GA (US)

( * ) Notice: Subject to any disclaimer, the term of this patent is extended or adjusted under 35 U.S.C. 154(b) by 0 days.

(21) Appl. No.: 14/441,414

(22) PCT Filed: Nov. 8, 2013

(86) PCT No.: PCT/EP2013/073408
§ 371 (c)(1),
(2) Date: May 7, 2015

(87) PCT Pub. No.: WO2014/072473
PCT Pub. Date: May 15, 2014

(65) Prior Publication Data
US 2015/0299395 A1    Oct. 22, 2015

Related U.S. Application Data

(60) Provisional application No. 61/724,725, filed on Nov. 9, 2012.

(30) Foreign Application Priority Data

Nov. 28, 2012 (EP) .................................. 12194545

(51) Int. Cl.
*C08J 5/18* (2006.01)
*B01D 71/68* (2006.01)
*C08G 75/23* (2006.01)

(52) U.S. Cl.
CPC ............. *C08G 75/23* (2013.01); *B01D 71/68* (2013.01); *C08J 5/18* (2013.01); *C08J 2381/06* (2013.01)

(58) Field of Classification Search
CPC ............ C08G 75/23; C08G 2261/3444; C08G 65/4093
See application file for complete search history.

(56) References Cited

U.S. PATENT DOCUMENTS

| 4,767,838 A | * | 8/1988 | Clendinning | .......... C08G 65/48 |
| | | | | 525/471 |
| 5,889,077 A | * | 3/1999 | Fuller | .................... B41J 2/1604 |
| | | | | 522/111 |

OTHER PUBLICATIONS

Kricheldorf H.S. et al., "New polymer syntheses. LXXXII. Syntheses of poly(ether-sulfone)s from silylated aliphatic diols including chiral monomers", Journal of Polymer Science Part A: Polymer Chemistry, Nov. 15, 1995 (Nov. 15, 1995), vol. 33, No. 15, pp. 2667-2671, XP055053356, ISSN: 0887-624X, DOI: 10.1002/oola.1995.080331513.
Chatti S. et al., "Poly(ether sulfone) of Isosorbide, Isomannide and Isoidide", High Performance Polymers, Feb. 1, 2009 (Feb. 1, 2009), vol. 21, No. 1, pp. 105-118, XP008151327, ISSN: 0954-0083, DOI: 10.1177/0954008308088296—Institute of Physics Publishing, Bristol, GB.

* cited by examiner

*Primary Examiner* — Shane Fang
(74) *Attorney, Agent, or Firm* — Jarrod N. Raphael; Helene Laville

(57) ABSTRACT

A process for the manufacturing of a poly(arylether sulfone) polymer comprising reacting in a solvent mixture comprising a polar aprotic solvent and in the presence of an alkali metal carbonate, a monomer mixture which contains: at least one 1,4:3,6-dianhydrohexitol selected from the group consisting of isosorbide (1), isomannide (2) and isoidide (3); at least one dihaloaryl compound of formula (S):

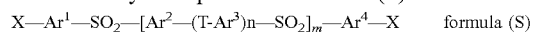

$$X\text{—}Ar^1\text{—}SO_2\text{—}[Ar^2\text{—}(T\text{-}Ar^3)n\text{—}SO_2]_m\text{—}Ar^4\text{—}X' \quad \text{formula (S)}$$

wherein n and m, equal to or different from each other, are independently zero or an integer of 1 to 5; X and X', equal to or different from each other, are halogens selected from F, Cl, Br, I; each of $Ar^1$, $Ar^2$, $Ar^3$ and $Ar^4$ equal to or different from each other and at each occurrence, is an aromatic moiety, T is a bond or a divalent group optionally comprising one or more than one heteroatom; optionally, at least one dihydroxyl compound different from the diol (AA); optionally, at least one dihaloaryl compound different from the dihalo (BB); and optionally, at least one hydroxyl-halo compound [hydro-halo (A'B')]; being understood that the overall amount of halo-groups and hydroxyl-groups of the monomers of the monomer mixture is substantially equimolecular, so as to obtain a polymer (b-PAES), wherein the reaction is carried out at a total % monomer mixture concentration equal to or more 10% and less than 70% with respect to the combined weight of monomer mixture and solvent mixture.

19 Claims, No Drawings

POLYARYLENE ETHER SULFONES

This application claims priority to U.S. provisional application No. 61/724725 filed on 9 Nov. 2012 and to European application No. 12194545.5 filed on 28 Nov. 2012, the whole content of each of these applications being incorporated herein by reference for all purposes.

FIELD OF INVENTION

The present invention pertains to novel polyarylene ether sulfones derived from bio-based feed-stocks, to a process for the manufacture of polyarylene ether sulfones derived from bio-based feed-stocks having high molecular weights, and to their use for the manufacture of shaped articles.

BACKGROUND OF THE INVENTION

The development of renewable bio-based chemicals has the potential to reduce the amount of petroleum consumed in the chemical industry and also to open new high-value-added markets to agriculture; 1,4:3,6-dianhydrohexitols are examples of such chemicals.

Interest in the production of 1,4:3,6-dianhydrohexitols, especially isosorbide, has been generated by potential industrial applications including the synthesis of polymers such as notably polyesters, polyethers, polyurethanes and polyamides. The use of 1,4:3,6-dianhydrohexitols in polymers, and more specifically in polycondensates, can be motivated by several features: they are rigid molecules, chiral, and non-toxic. For these reasons, there are expectations that polymers with high glass transition temperature and/or with special optical properties can be synthesized. Also the innocuous character of the molecules opens the possibility of applications in packaging or medical devices.

The industrial production of such monomers is a developing area, quickly making available this feedstock at more and more attractive prices. Moreover, interest in chemicals derived from renewable resources is increasing and becoming a decisive argument: as the carbon contained in bioplastics is not derived from fossilized biomass, but from atmospheric $CO_2$ absorbed by vegetals biomass, these plastics should alleviate the effects of climate change.

Depending on the chirality, three isomers of the 1,4:3,6-dianhydrohexitols sugar diol exist, namely isosorbide (1), isomannide (2) and isoidide (3):

Scheme 1

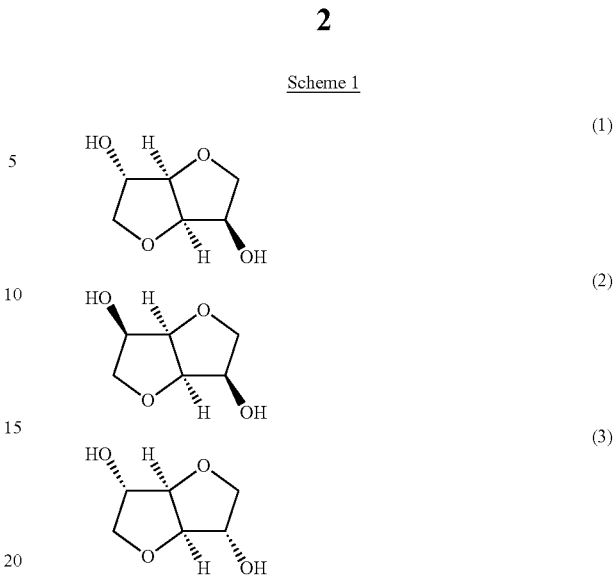

The 1,4:3,6-dianhydrohexitols are composed of two cis-fused tetrahydrofuran rings, nearly planar and V-shaped with a 120° angle between rings. The hydroxyl groups are situated at carbons 2 and 5 and positioned on either inside or outside the V-shaped molecule, as shown in scheme 1. They are designated, respectively, as endo or exo. Isoidide has two exo hydroxyl groups, whereas for isomannide they are both endo, and for isosorbide there is one exo and one endo hydroxyl group. It is generally understood that the presence of the exo substituent increases the stability of the cycle to which it is attached. Also, exo and endo groups exhibit different reactivities since they are more or less accessible depending on the steric requirements of the studied reaction. The reactivity also depends on the existence of intramolecular hydrogen bonds.

As per the manufacture of these 1,4:3,6-dianhydrohexitols, to summarize briefly, starch extracted from biomass and in particular from corn starch, is first degraded into d-glucose (1.A) and d-mannose (2.A) by an enzymatic process. The hydrogenation of these two sugars gives d-sorbitol (1.B) and d-mannitol (2.B); sorbitol and mannitol can subsequently be dehydrated to obtain isosorbide (1) and isomannide (2), as shown herein below:

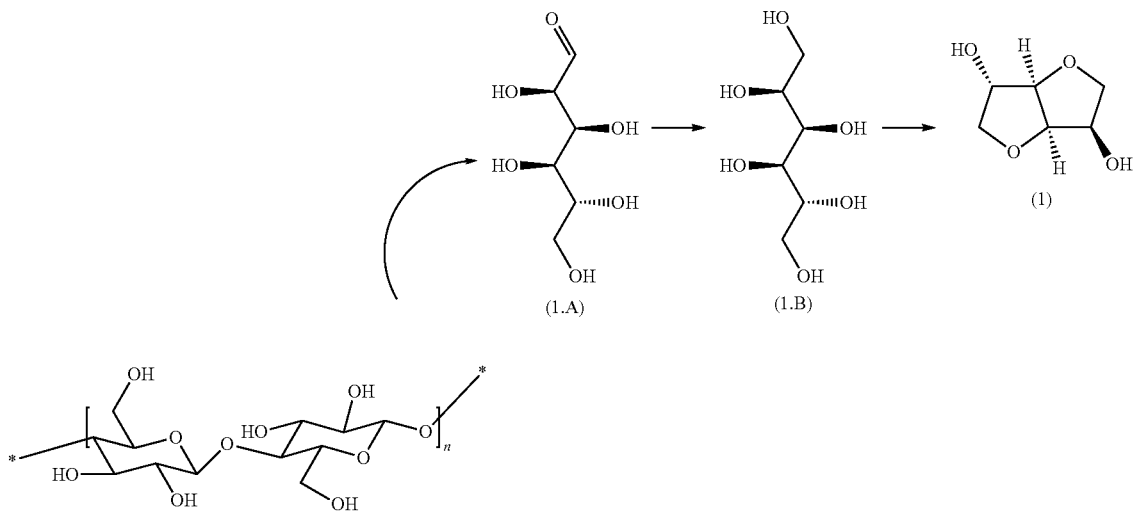

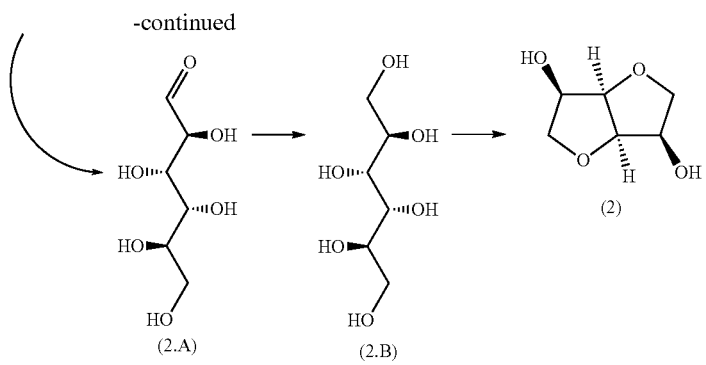

Finally, the third isomer, isoidide (3), can be produced from 1-idose following a similar procedure as above sketched, but 1-idose rarely exists in nature and cannot be extracted from vegetal biomass. For this reason researchers have developed different pathways to isoidide, including isomerisation of isosorbide or isomannide.

Kricheldorf et al. first reported the preparation and characterization of poly(ether sulfone)s containing isosorbide from silylated isosorbide and difluorodiphenylsulfone (DFDPS) in 1995 (H. Kricheldorf, M. Al Masri, J. Polymer Sci., Pt A: Polymer Chemistry, 1995, 33, 2667-2671). Since the silylation step adds significant cost, Kricheldorf and Chatti (High Performance Polymers, 2009, 21, 105-118) modified their polymerization conditions and reported that poly(ether sulfone)s containing isosorbide could be made from pure isosorbide and DFDPS. The highest apparent molecular weight polymer obtained had an inherent viscosity (IV) of 0.65 dL/g, said IV was measured according to following conditions: $CH_2Cl_2$/trifluoroacetic acid solution (9/1 v/v) at 20° C., 0.20 dL/g. The glass transition temperature of this polymer was reported as 245° C. No examples were described where the polymerization reaction with isosorbide was conducted with the less reactive dichlorodiphenylsulfone (DCDPS).

There is still a need in the art for an efficient process for the manufacturing of poly(arylether sulfone)s (PAES) polymers comprising recurring units derived from bio-compatible and bio-based raw materials and a variety of dihaloaryl compounds comprising at least one $SO_2$ group, whereby said (PAES) polymers are characterized by having high molecular weights (Mw); having excellent thermal stability, high stiffness and strength, good toughness and attractive impact properties; allowing to provide improved performance relative to current commercial PAES grades for applications such as membrane, medical, aerospace, automotive applications.

SUMMARY OF INVENTION

The Applicant has now found that it is possible to advantageously manufacture poly(arylether sulfone)s (PAES) having high molecular weight comprising moieties derived from incorporation of 1,4:3,6-dianhydrohexitols, said PAES polymers advantageously fulfilling the above mentioned needs, including excellent thermal stability, and improved impact properties.

The invention pertains to a process for the manufacturing of a poly(arylether sulfone)polymer [polymer (b-PAES), herein after] comprising reacting in a solvent mixture comprising a polar aprotic solvent and in the presence of an alkali metal carbonate, a monomer mixture which contains:

at least one 1,4:3,6-dianhydrohexitol [diol (AA), herein after] selected from the group consisting of isosorbide (1), isomannide (2) and isoidide (3):

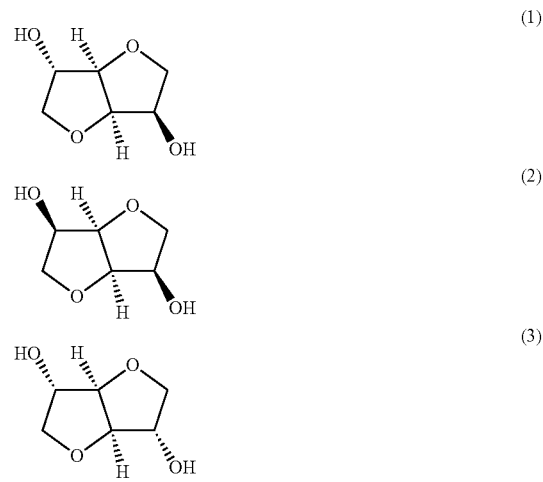

at least one dihaloaryl compound [dihalo(BB), herein after] of formula (S):

$$X-Ar^1-SO_2-[Ar^2-(T-Ar^3)_n-SO_2]_m-Ar^4-X' \quad \text{formula (S)}$$

wherein
n and m, equal to or different from each other, are independently zero or an integer of 1 to 5; X and X', equal to or different from each other, are halogens selected from F, Cl, Br, I; preferably Cl or F.

each of $Ar^1$, $Ar^2$, $Ar^3$ and $Ar^4$ equal to or different from each other and at each occurrence, is an aromatic moiety.

T is a bond or a divalent group optionally comprising one or more than one heteroatom; preferably T is selected from the group consisting of a bond, $-CH_2-$, $-C(O)-$, $-C(CH_3)_2-$, $-C(CF_3)_2-$, $-C(=CCl_2)-$, $-C(CH_3)(CH_2CH_2COOH)-$, and a group of formula:

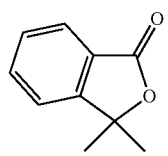

optionally, at least one dihydroxyl compound [diol (A'A')] different from diol (AA), as detailed above;

optionally, at least one dihaloaryl compound [dihalo (B'B')] different from dihalo (BB), as detailed above;

optionally, at least one hydroxyl-halo compound [hydrohalo (A'B')]; being understood that the overall amount of halo-groups and hydroxyl-groups of the monomers of the monomer mixture is substantially equimolecular, so as to obtain a polymer (b-PAES), wherein the reaction is carried out at a total % monomer mixture concentration [total % monomers, herein after] equal to or more 15% and less than 70% with respect to the combined weight of monomer mixture and solvent mixture.

As said, the term" total % monomers" is defined as the sum of the weight of all monomers initially present in the monomer mixture in grams, designated as $M_{wt}$, divided by the combined weight of all monomers initially present in the monomer mixture and of the solvent mixture, wherein the weight of the solvent mixture in grams is designated as $S_{wt}$.

The total % monomers is thus equal to the formula:

$$100 \times M_{wt}/(M_{wt}+S_{wt}).$$

The total % monomers is more preferably at least 20%, even more preferably at least 25%.

The total % monomers is in general less than 60%, preferably less than 50%, more preferably less than 45% and even more preferably les than 42%.

Very good results have been obtained at a total % monomers in a range from 25% -42%.

For the purpose of the present invention, the expression "substantially equimolecular" used with reference to the overall amount of halo-groups and hydroxyl-groups of the monomers of the monomer mixture, as above detailed, is to be understood that the molar ratio between the overall amount of hydroxyl groups of the monomers of the monomer mixture and overall amount of halo groups of the monomers of the monomer mixture is of 0.95 to 1.05, preferably of 1.00 to 1.04, more preferably of 1.01 to 1.02, good results were obtained with a ratio of 1.02.

The aromatic moiety in each of $Ar^1$, $Ar^2$, $Ar^3$ and $Ar^4$ equal to or different from each other and at each occurrence is preferably complying with following formulae:

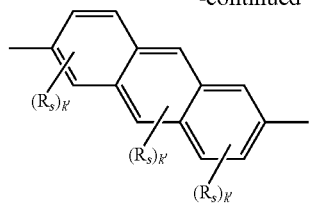

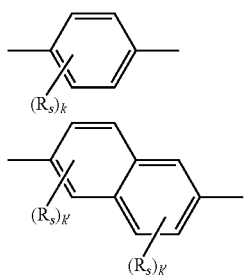

-continued wherein:

each $R_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and k is zero or an integer of 1 to 4; k is zero or an integer of 1 to 3.

Preferred dihalo (BB) are those complying with formulae (S'-1) to (S'-3), as shown below:

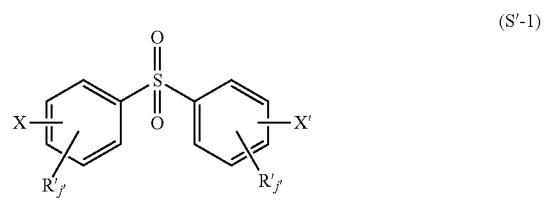
(S'-1)

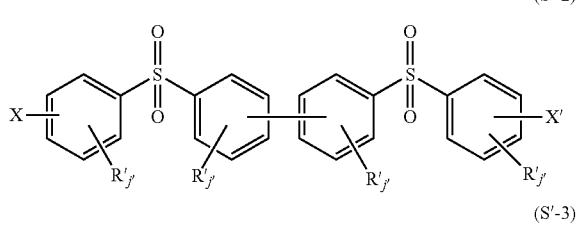
(S'-2)

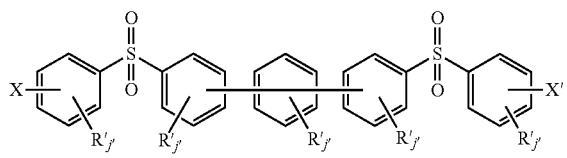
(S'-3)

wherein:

each of R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

X and X', equal to or different from each other, are independently a halogen atom, preferably Cl or F.

More preferred dihalo (BB) are those complying with following formulae shown below:

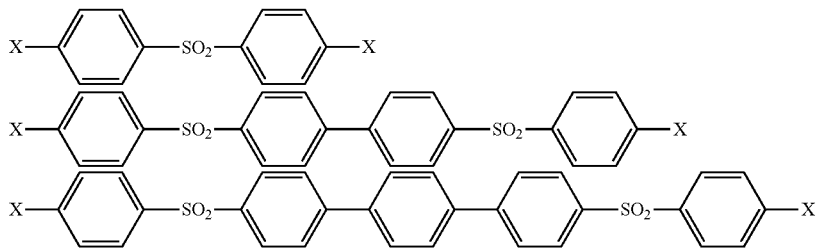

wherein X is as defined above, X is preferably Cl or F.

Preferred dihaloaryl compounds [dihalo (BB)] are 4,4'-difluorodiphenyl sulfone (DFDPS) and 4,4'-dichlorodiphenyl sulfone (DCDPS).

According to certain embodiments, the monomer mixture, as detailed above, comprises a dihaloaryl compound obtained by reaction of a precursor dihaloaryl compound of formula (S), as detailed above, wherein X, X' is Cl [precursor dihalo ($B_{Cl}B_{Cl}$), herein after] with at least one fluorinating agent ["Halex" reaction, herein after].

For the purpose of the present invention, the term "fluorinating agent" is intended to denote all reactants that are capable of substituting a fluorine atom for the chlorine atom in dihalo($B_{Cl}B_{Cl}$), as detailed above.

As non limitative examples of fluorinating agents useful in the present invention are alkali or alkaline earth metal fluorides, e.g. LiF, NaF, KF, CsF, tetramethyl ammonium fluoride or tetrabutylammonium fluoride (TBAF), $NH_4F$ or amine hydro fluorides, or the respective HF adducts. Preferred fluorinating agents are KF and CsF.

The amount of said fluorinating agent used, when expressed by the ratio of the equivalents of fluorine group (F) per equivalent of chlorine group (Cl) [eq. (F)/eq. (Cl)] ranges from 8.0 to 0.5, preferably from 6 to 1, and more preferably from 4 to 1.5, being understood that above mentioned chlorine group equivalents are comprehensive of those of the dihalo($B_{Cl}B_{Cl}$). Very good results have been obtained with a ratio of eq. (F)/eq. (Cl) of 2.

The "Halex" reaction can be carried out in a separate step prior to the polymerization step or "in situ" during the polymerization step.

Preferably, the "Halex" reaction is carried out "in situ" as such that the reaction mixture including the solvent mixture comprising the polar aprotic solvent, the alkali metal carbonate and the monomer mixture, as described above, further comprises the at least one fluorinating agent.

In another embodiment, the "Halex" reaction can be carried out in a separate step wherein the precursor dihalo ($B_{Cl}B_{Cl}$), as detailed above, undergoes a chlorine-fluorine exchange reaction in a separate step thereby providing a mixture of Halex products. This being said, it is understood by the skilled in the art that said mixture of Halex products can suitably be used as monomers of the monomer mixture, as detailed above, in the process of the present invention, as detailed above.

If desired, the mixture of Halex products can be further purified by techniques known in the art such as notably distillation, column chromatography, crystallization, solid support chemistry, ion exchange chromatography, and the like.

Said mixture of Halex products comprises in general the unreacted precursor dihalo ($B_{Cl}B_{Cl}$), as detailed above, the fully fluorinated dihalo (BB), wherein X and X' is F [dihalo ($B_FB_F$) herein after] and the chlorofluoro dihalo (BB), wherein X and X' different from each other, are independently Cl or F.

The mixture of Halex products comprises the dihalo ($B_FB_F$) advantageously in an amount of at least 70% by weight (wt. %), preferably of at least 80 wt. %, more preferably of at least 85 wt. % and most preferably of at least 90 wt. %.

If desired, the precursor dihalo ($B_{Cl}B_{Cl}$), as detailed above, are completely converted to the dihalo ($B_FB_F$).

The "Halex" reaction can be performed in the presence of a solvent. Solvents that may be suitable for the "Halex" reaction of this invention are dimethylsulfoxide, dimethylsulfone, diphenylsulfone, diethylsulfoxide, diethylsulfone, diisopropylsulfone, tetrahydrothiophene-1,1-dioxide (commonly called tetramethylene sulfone or sulfolane) and tetrahydrothiophene-1-monoxide and mixtures thereof. Very good results have been obtained with sulfolane or dimethylsulfoxide.

The "Halex" reaction is advantageously performed at a temperature equal to or higher than 150° C., preferably equal to or higher than 165° C. and more preferably equal to or higher than 200° C.

If desired, the "Halex" reaction is carried out in the presence of a phase transfer catalyst.

As non limitative examples of phase transfer catalysts useful in the present invention are phosphazenium salts such as notably (1,1,1,3,3,3-Hexakis(dimethylamino)diphosphazenium tetrafluoroborate)-phosphazenium salt; crown ethers such as notably 18-crown-6 and 12-crown-4, dibenzo-18-crown-6 or dibenzo-12-crown ether-4; cryptands such as cryptand[2.2.2]; tetramethyl ammonium fluoride or tetrabutylammonium fluoride (TBAF).

According to certain embodiments, unequal reactivity of hydroxyl groups of 1,4:3,6-dianhydrohexitol may be used to generate in a first reaction step of the process of the invention a bio-hydroxyl-halo compound (AB); typical examples of these bio-hydroxyl-halo compounds (AB) are those obtained by partial reaction of the isosorbide and/or the isoidide, typically having formulae:

(b-AB-1)

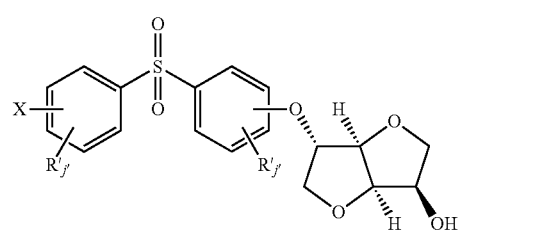

-continued

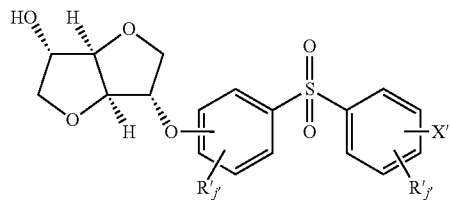
(b-AB-2)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; j' is zero or is an integer from 0 to 4 and X and X', equal to or different from each other, are independently a halogen atom, preferably Cl or F.

Among dihaloaryl compound [dihalo (B'B')] different from dihalo (BB) mention can be notably made of dihalobenzoid compound [dihalo (B'B')] of formula:

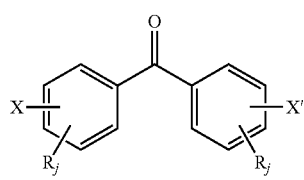
(B'B')

dihalo wherein:
each of R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j is zero or is an integer from 1 to 4;

X and X', equal to or different from each other, are independently a halogen atom, preferably Cl or F.

Preferred dihalobenzoid compound [dihalo (B'B')] are 4,4'-difluorobenzophenone, 4,4'-dichlorobenzophenone and 4-chloro-4'-fluorobenzophenone, with 4,4'-difluorobenzophenone being particularly preferred.

Among dihydroxyl compounds [diols (A'A')] different from diol (AA), as above detailed, mention can be of compounds of formula (O):

$$HO-Ar^5-(T'-Ar^6)_n-O-H \qquad \text{formula (O)}$$

wherein:
n is zero or an integer of 1 to 5;
each of $Ar^5$ and $Ar^6$, equal to or different from each other and at each occurrence, is an aromatic moiety of the formula:

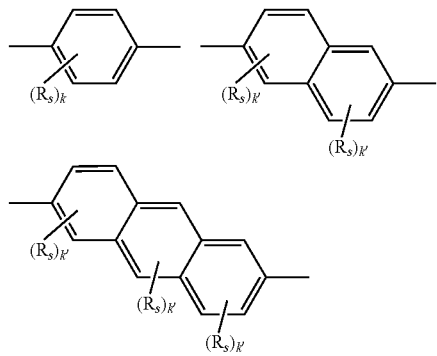

wherein:
each $R_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and k is zero or an integer of 1 to 4; k' is zero or an integer of 1 to 3; -T' is a bond or a divalent group optionally comprising one or more than one heteroatom; preferably T is selected from the group consisting of a bond, $-SO_2-$, $-CH_2-$, $-C(O)-$, $-C(CH_3)_2-$, $-C(CF_3)_2-$, $-C(=CCl_2)-$, $-C(CH_3)(CH_2CH_2COOH)-$, and a group of formula:

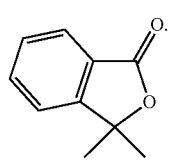

Among preferred dihydroxyl compounds [diols (A'A')] different from diol (AA), as above detailed, suitable for being used in the process of the present invention, mention may be notably made of the following molecules:

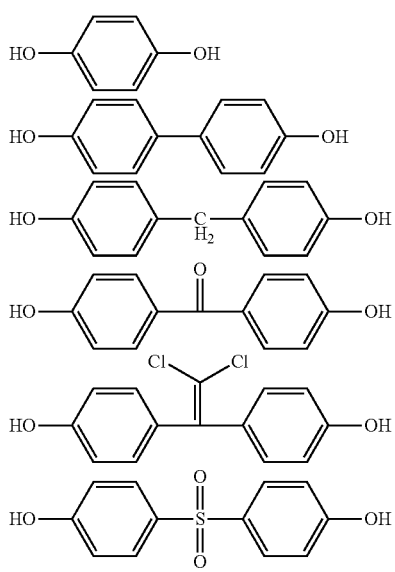

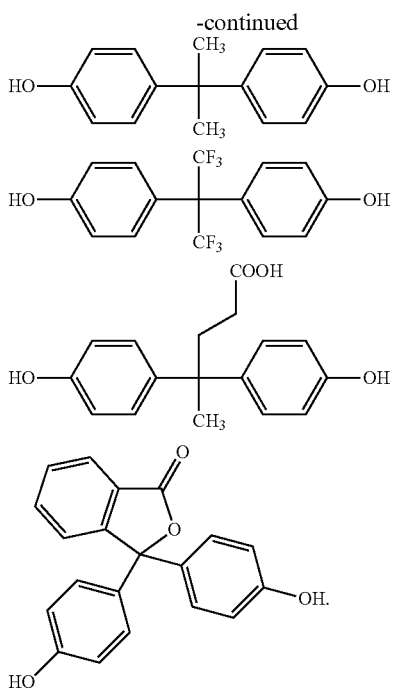

Among hydroxyl-halo compound [hydro-halo (A'B')] different from bio-hydroxyl-halo compound (AB), as above detailed, mention can be of compounds of any of formulae:

(A'B'-1)

(A'B'-2)

(A'B'-3)

(A'B'-4)

each of R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

T*, equal to or different from each other at each occurrence, is independently a bond or a divalent group optionally comprising one or more than one heteroatom; preferably T* is selected from the group consisting of a bond, —SO$_2$—, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—;

j is zero or is an integer from 1 to 4;

X and X', equal to or different from each other, are independently a halogen atom, preferably Cl or F.

According to all embodiments of the present invention, the diol (AA) and dihalo (BB) and all other optional components (e.g. diol (A'A'), dihalo (B'B') and hydro-halo (A'B')) are dissolved or dispersed in a solvent mixture comprising a polar aprotic solvent.

If desired, an additional solvent can be used together with the polar aprotic solvent which forms an azeotrope with water, whereby water formed as a by-product during the polymerization may be removed by continuous azeotropic distillation throughout the polymerization.

The by-product water and carbon dioxide possibly formed during the polymerization can alternatively be removed using a controlled stream of an inter gas such as nitrogen or argon over and/or in to the reaction mixture in addition to or advantageously in the absence of an azeotrope-forming solvent as described above.

For the purpose of the present invention, the term "additional solvent" is understood to denote a solvent different from the polar aprotic solvent and the reactants and the products of said reaction.

As polar aprotic solvents, sulphur containing solvents known and generically described in the art as dialkyl sulfoxides and dialkylsulfones wherein the alkyl groups may contain from 1 to 8 carbon atoms, including cyclic alkyliden analogs thereof, can be mentioned. Specifically, among the sulphur-containing solvents that may be suitable for the purposes of this invention are dimethylsulfoxide, dimethylsulfone, diphenylsulfone, diethylsulfoxide, diethylsulfone, diisopropylsulfone, tetrahydrothiophene-1, 1-dioxide (commonly called tetramethylene sulfone or sulfolane) and tetrahydrothiophene-1-monoxide and mixtures thereof.

Very good results have been obtained with sulfolane.

Nitrogen-containing polar aprotic solvents, including dimethylacetamide, dimethylformamide and N-methyl pyrrolidone (i.e., NMP) and the like have been disclosed in the art for use in these processes, and may also be found useful in the practice of this invention. Very good results have been obtained with NMP.

The additional solvent that forms an azeotrope with water will generally be selected to be inert with respect to the monomer components and polar aprotic solvent. Suitable azeotrope-forming solvents for use in such polymerization processes include aromatic hydrocarbons such as benzene, toluene, xylene, ethylbenzene, chlorobenzene and the like.

The azeotrope-forming solvent and polar aprotic solvent are typically employed in a weight ratio of from about 1:10 to about 1:1, preferably from about 1:5 to about 1:3.

The alkali metal carbonate is preferably sodium carbonate, potassium carbonate, rubidium carbonate and cesium carbonate. Sodium carbonate and especially potassium carbonate are preferred. Mixtures of more than one carbonates can be used, for example, a mixture of sodium carbonate or bicarbonate and a second alkali metal carbonate or bicarbonate having a higher atomic number than that of sodium.

The amount of said alkali metal carbonate used, when expressed by the ratio of the equivalents of alkali metal (M) per equivalent of hydroxyl group (OH) [eq. (M)/eq. (OH)] ranges from 1.3 to 4.0, preferably from 1.4 to 3, and more preferably from about 1.5 to 2.5, being understood that above mentioned hydroxyl group equivalents are comprehensive of those of the diol (AA), and, if present, of bio-hydroxyl-halo compound (AB), of diol (A'A') and of hydro-halo (A'B'). Very good results have been obtained with a ratio of eq. (M)/eq. (OH) of 2.0.

The Applicant has surprisingly found that the use of an optimum amount of alkali metal carbonate allows reducing significantly the reaction times of the process of the present invention while avoiding using excessive amounts of alkali metal carbonate which leads to higher costs and more difficult polymer purifications.

The use of an alkali metal carbonate having an average particle size of less than about 100 μm, preferably of less than about 50 μm is particularly advantageous. The use of an alkali metal carbonate having such a particle size permits the synthesis of the polymers to be carried out at a relatively lower reaction temperature with faster reaction.

According to a preferred embodiment of the present invention, the process is carried out in a solvent mixture comprising a polar aprotic solvent at a total % solids from in a range from 32% -38% and a ratio of eq. (M)/eq. (OH) of 2.0.

Generally, after an initial heat up period, the temperature of the reaction mixture will be maintained in a range of advantageously from 80-240° C., preferably from 120 to 230° C.

The reaction time is typically from 2 to 20 hours, preferably from 3 to 12 hours, most preferably from 4 to 6 hours.

According to certain embodiments, the polymer (b-PAES) prepared according to the process of the present invention, as mentioned above, includes any polymer of which more than 30% moles of the recurring units are recurring units ($R_b$) derived from (I) at least one diol (AA), as detailed above and (II) at least dihalo (BB), as detailed above, being reacted in substantially equimolecular amount and in the presence of an alkali metal carbonate.

Preferred recurring units ($R_b$) are selected from the group consisting of those of formula ($R_b$-1) to ($R_b$-6) herein below:

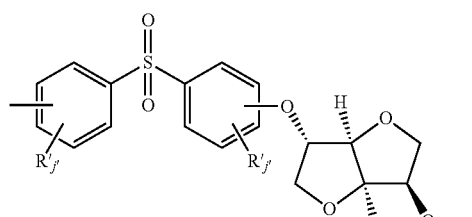

($R_b$-1)

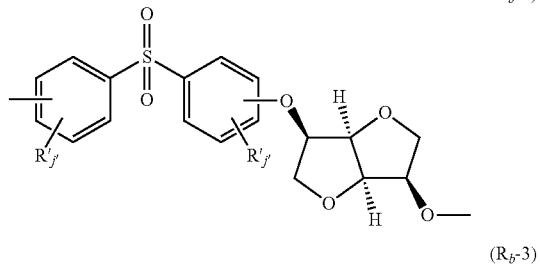

($R_b$-2)

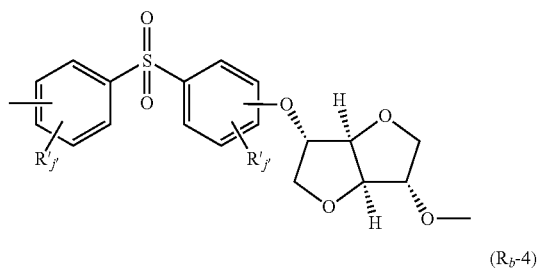

($R_b$-3)

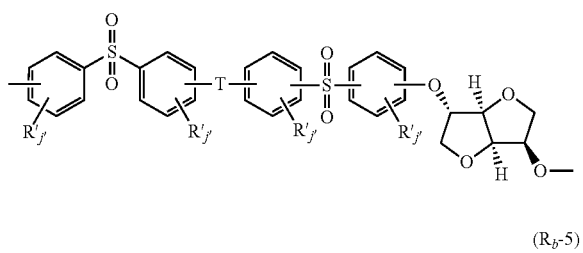

($R_b$-4)

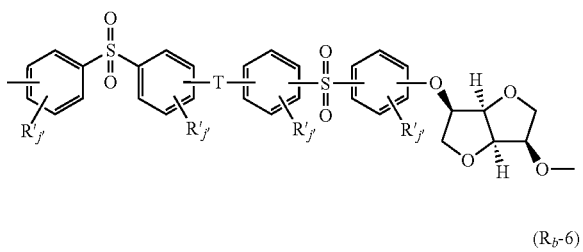

($R_b$-5)

($R_b$-6)

wherein:
each R' is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or an integer of 1 to 4;

T is a bond or a divalent group optionally comprising one or more than one heteroatom; preferably T is selected from the group consisting of a bond, —$CH_2$—, —C(O)—, —C($CH_3$)$_2$—, —C($CF_3$)$_2$—, —C(=$CCl_2$)—, —C($CH_3$)($CH_2CH_2COOH$)—, and a group of formula:

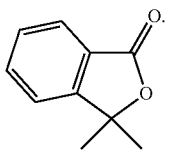

The above recurring units of preferred embodiments ($R_b$-1), ($R_b$-2), ($R_b$-3), ($R_b$-4), ($R_b$-5) and ($R_b$-6), can be each present alone or in admixture.

More preferred recurring units ($R_b$) are those of formula ($R_b$-1) and ($R_b$-4), optionally in combination with recurring units of formula ($R_b$-2), ($R_b$-3), ($R_b$-5) and ($R_b$-6).

Most preferred recurring units ($R_b$) are of formula ($R_b$-1), optionally in combination with recurring units of formula ($R_b$-2) and ($R_b$-3).

In recurring unit ($R_b$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage. Still, in recurring units ($R_b$), j' is at each occurrence zero, that is to say that the phenylene moieties have no other substituents than those enabling linkage in the main chain of the polymer.

According to certain embodiments, the polymer (b-PAES), as prepared according to the process of the present invention which comprises additionally reacting of a least one diol (A'A') different from diol (AA), as detailed above; at least one dihalo (B'B') different from dihalo (BB), as detailed above; and at least one hydro-halo (A'B') as detailed above, comprises in addition to recurring units ($R_b$), as detailed above, recurring units ($R_c$) comprising a Ar—SO$_2$—Ar' group, with Ar and Ar', equal to or different from each other, being aromatic groups, said recurring units ($R_c$) generally complying with formulae (S1):

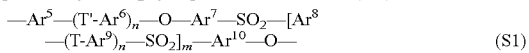

wherein:
Ar$^5$, Ar$^6$, Ar$^7$, Ar$^8$, and Ar$^9$, equal to or different from each other and at each occurrence, are independently a aromatic mono- or polynuclear group;

T and T', equal to or different from each other and at each occurrence, is independently a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

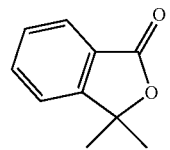

preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

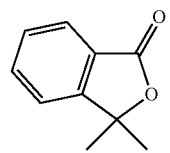

n and m, equal to or different from each other, are independently zero or an integer of 1 to 5;

Recurring units ($R_c$) can be notably selected from the group consisting of those of formulae (S1-A) to (S1-D) herein below:

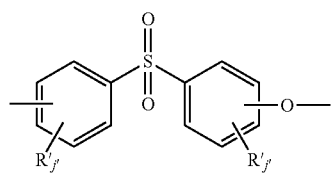
(S1-A)

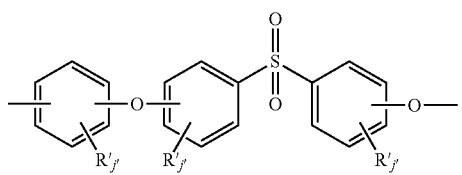
(S1-B)

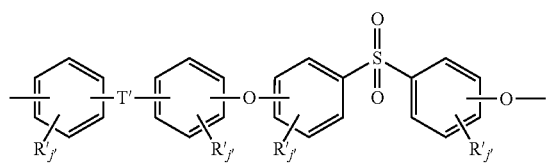
(S1-C)

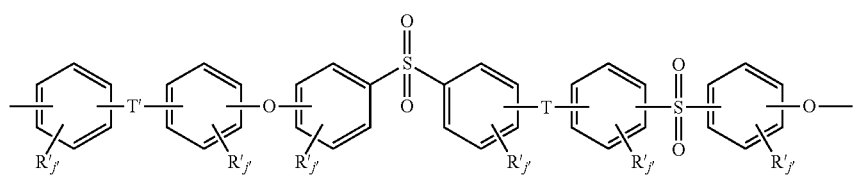
(S1-D)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other are a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

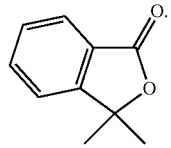

preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

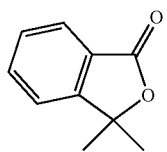

In recurring unit (R$_c$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage. Still, in recurring units (R$_c$), j' is at each occurrence zero, that is to say that the phenylene moieties have no other substituents than those enabling linkage in the main chain of the polymer.

According to certain embodiments, the polymer (b-PAES), as prepared according to the process of the present invention which comprises additionally reacting of a least one diol (A'A') different from diol (AA), as detailed above; at least one dihalo (B'B') different from dihalo (BB), as detailed above; and at least one hydro-halo (A'B') as detailed above, can thus comprise, in addition to recurring units (R$_b$), as detailed above, recurring units (R$_a$) comprising a Ar—C(O)—Ar' group, with Ar and Ar', equal to or different from each other, being aromatic groups, said recurring units (R$_a$) being generally selected from the group consisting of formulae (J-A) to (J-O), herein below:

(J-A)

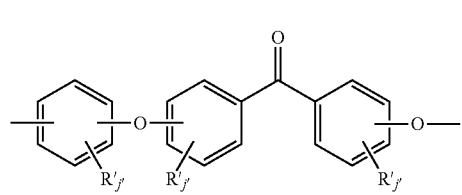

(J-B)

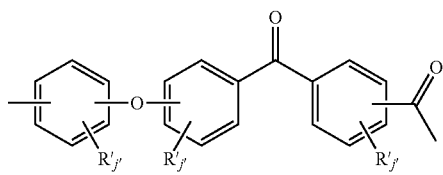

(J-C)

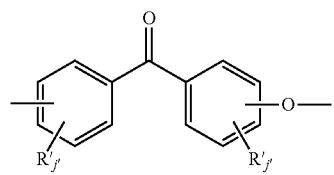

(J-D)

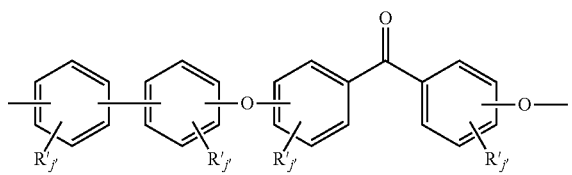

(J-E)

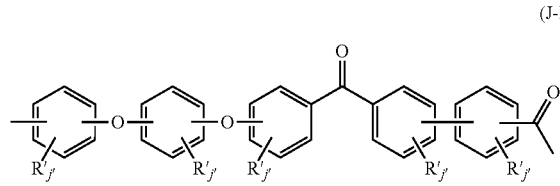

(J-F)

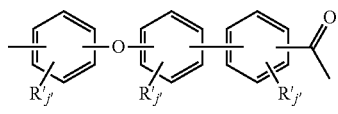

(J-G)

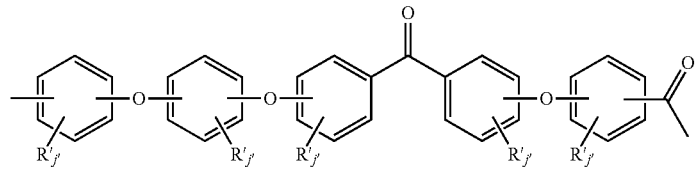

-continued

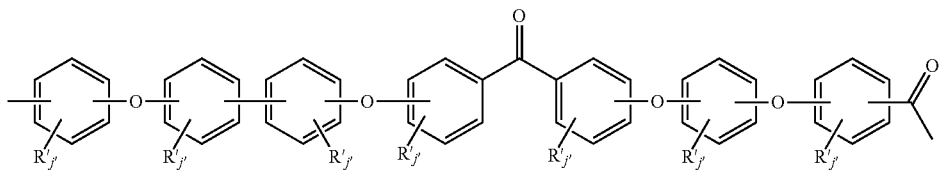
(J-H)

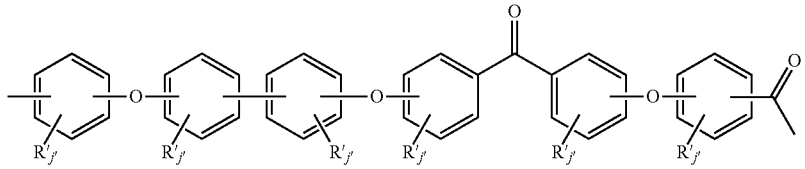
(J-I)

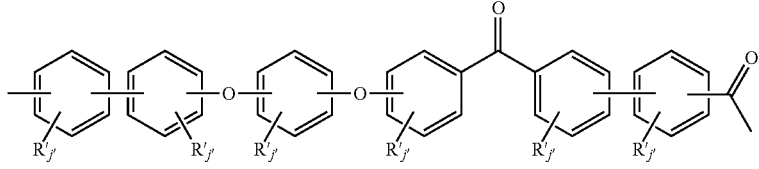
(J-J)

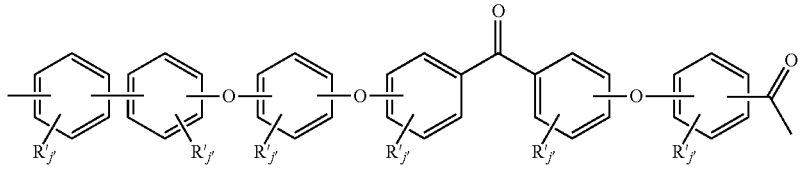
(J-K)

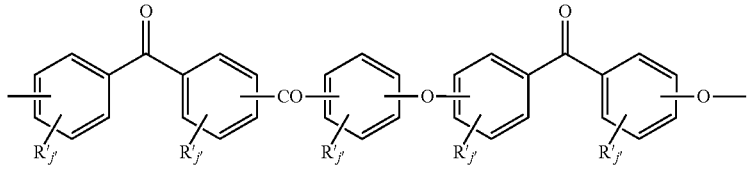
(J-L)

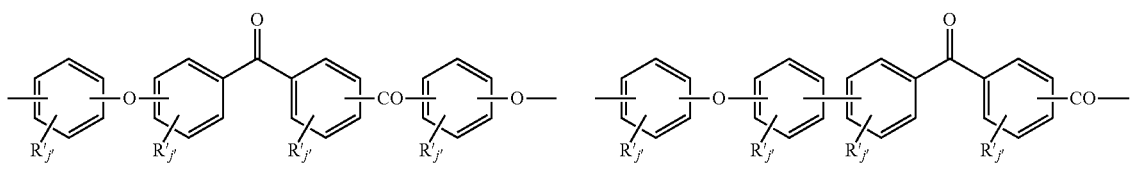
(J-M) (J-N)

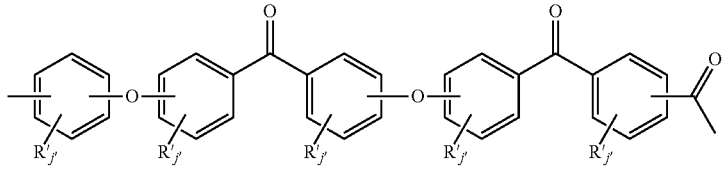
(J-O)

wherein:
  each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
  j' is zero or is an integer from 0 to 4.

In recurring unit ($R_a$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_a$), j' is at each occurrence zero, that is to say that the phenylene moieties have no other substituents than those enabling linkage in the main chain of the polymer.

As said, the polymer (b-PAES) comprises recurring units of formula $R_b$ as above detailed in an amount of at least 30% moles, preferably 35% moles, more preferably 40% moles, even more preferably at least 50% moles, with respect to all recurring units of polymer (b-PAES).

According to certain preferred embodiments, more than 70, and more preferably more than 85% moles of the recurring units of the polymer (b-PAES) are recurring units ($R_b$), as above detailed, the complement to 100% moles being generally recurring units ($R_a$), as above detailed, and/or recurring units ($R_c$), as above detailed.

Still more preferably, essentially all the recurring units of the polymer (b-PAES) are recurring units ($R_b$), chain defects, or very minor amounts of other units might be present, being understood that these latter do not substantially modify the properties of polymer (b-PAES). Most preferably, all the recurring units of the polymer (b-PAES) are recurring units ($R_b$). Excellent results were obtained when the polymer (b-PAES) was a polymer of which all the recurring units are recurring units ($R_b$), as above detailed.

It is another object of the present invention to provide a polymer (b-PAES$_{Cl}$) prepared by the process according to the invention wherein said polymer (b-PAES$_{Cl}$) is derived from halo compounds, notably including dihalo (BB) and/or in combination of optional dihalo (B'B') compounds, as above detailed, wherein X and X' is Cl.

It is another object of the present invention to provide a polymer (b-PAES$_{F/Cl}$) prepared by the process according to the invention wherein said polymer (b-PAESp$_{Cl}$) is derived from a monomer mixture which is comprising a dihaloaryl compound obtained by the "Halex reaction", as detailed above, of a precursor dihalo (B$_{Cl}$B$_{Cl}$), as detailed above.

The polymer (b-PAES), prepared by the process of the present invention, has in general a weight averaged molecular weight of at least 20 000, preferably at least 30 000, more preferably at least 40 000.

The weight average molecular weight ($M_w$) and the number average molecular weight ($M_n$) can be estimated by gel-permeation chromatography (GPC) using ASTM D5296 calibrated with polystyrene standards.

The weight average molecular weight ($M_w$) is:

$$M_w = \frac{\sum M_i^2 \cdot N_i}{\sum M_i \cdot N_i}$$

The number average molecular weight ($M_n$):

$$M_n = \frac{\sum M_i \cdot N_i}{\sum N_i},$$

and
the polydispersity index (PDI) is hereby expressed as the ratio of weight average molecular weight ($M_w$) to number average molecular weight ($M_n$).

The polymer (b-PAES), as prepared according to the process of the present invention generally has a polydispersity index of less than 2.5, preferably of less than 2.4, more preferably of less than 2.2. This relatively narrow molecular weight distribution is representative of an ensemble of molecular chains with similar molecular weights and substantially free from oligomeric fractions, which might have a detrimental effect on polymer properties.

The polymer (b-PAES), as prepared according to the process of the present invention advantageously possesses a glass transition temperature of at least 200° C., preferably 210° C., more preferably at least 220° C. Such high glass transition temperatures are advantageous for extending temperatures range of use of the polymer (b-PAES).

Glass transition temperature (Tg) is generally determined by DSC, according to ASTM D3418.

In other words, the Applicant has succeeded in providing a process for the manufacturing of a polymer (b-PAES) wherein the moieties of 1,4:3,6-dianhydrohexitols have been successfully incorporated in the chain with no detrimental effect in polymerization reactivity, so that an excellent material, with fully controlled structure is advantageously obtained.

Said process of the present invention, enables the preparation of polymers (b-PAES) which have advantageously extremely low levels of insolubles and extractables, but still possessing increased bio-compatibility due to the 1,4:3,6-dianhydrohexitols units, which have been found to be particularly useful for manufacturing membranes, in particularly those intended for contact with body fluids and/or food and beverages.

The polymer (b-PAES), as prepared according to the process of the present invention, can notably be used in medical, automotive, construction and aerospace applications as fibers, Further mention can be made of automotive and aerospace applications as notably membranes, films and sheets, fibers, foams and three-dimensional moulded parts.

As per the processing, the polymer (b-PAES), as prepared according to the process of the present invention, can be advantageously processed for yielding all above mentioned articles by melt processing (including injection moulding, extrusion moulding, compression moulding), but also by solution processing, because of the solubility of the polymer (b-PAES).

It is another object of the present invention to provide a shaped article comprising the polymer (b-PAES), as prepared according to the process of the present invention.

Non limitative examples of shaped articles which can be manufactured starting from polymer (b-PAES), as prepared according to the process of the present invention, thereby using different processing technologies are generally selected from the group consisting of melt processed films, solution processed films (porous and non porous films, including solution casted membranes, and membranes from solution spinning), melt process monofilaments and fibers, solution processed monofilaments, hollow fibers and solid fibers, and injection and compression molded objects.

Among membranes, the polymer (b-PAES), as prepared according to the process of the present invention, is particularly suitable for manufacturing membranes intended for contact with aqueous media, including body fluids; thus, shaped articles which can be manufactured from said polymer (b-PAES) as above detailed are advantageously membranes for bioprocessing and medical filtrations, including hemodialysis membranes, membranes for food and beverage processing, membranes for waste water treatment and membranes for industrial process separations involving aqueous media.

From an architectural perspective, membranes manufactured from said polymer (b-PAES) as above detailed may be provided under the form of flat structures (e.g. films or sheets), corrugated structures (such as corrugated sheets), tubular structures, or hollow fibers; as per the pore size is concerned, full range of membranes (non porous and porous, including for microfiltration, ultrafiltration, nanofiltration, and reverse osmosis) can be advantageously manufactured from said polymer (b-PAES); pore distribution can be isotropic or anisotropic.

Shaped articles manufactured from the polymer (b-PAES), as prepared according to the process of the present invention, can be, as above mentioned, under the form of films and sheets. These shaped articles are particularly useful as specialized optical films or sheets, and/or suitable for packaging.

Further, shaped articles manufactured from the polymer (b-PAES), as prepared according to the process of the present invention, can be three-dimensional moulded parts, in particular transparent or coloured parts.

Among applications of use wherein such injection moulded parts can be used, mention can be made of healthcare applications, in particular medical and dental applications, wherein shaped articles made from the polymer (b-PAES), as prepared according to the process of the present invention, can advantageously be used for replacing metal, glass and other traditional materials in single-use and reusable instruments and devices. Should the disclosure of any patents, patent applications, and publications which are incorporated herein by reference conflict with the description of the present application to the extent that it may render a term unclear, the present description shall take precedence.

EXAMPLES

The invention will be now described in more details with reference to the following examples, whose purpose is merely illustrative and not intended to limit the scope of the invention.

General Description of the Preparation of the polymer (b-PAES)

To a clean 250 mL four-neck round bottom flask fitted with a mechanical stirrer, Dean-Stark trap, condenser, and nitrogen inlet, was placed the isosorbide, the dihalo (BB) (4,4'-difluorodiphenyl sulfone (DFDPS) or 4,4'-dichlorodiphenyl sulfone (DCDPS)), and potassium carbonate followed by the polar aprotic solvent (sulfolane or dimethylsulfoxide (DMSO)) and optionally the additional solvent (e.g. toluene). A slight stream of nitrogen was applied above the reaction mixture through one of the necks of the flask with an exit through a bubbler above the condenser. The reaction mixture was stirred with an overhead mechanical agitator and warmed using an oil bath controlled at the appropriate temperature. The bath temperature increased from 21° C. to the appropriate temperature over about 30-60 minutes and held at the reaction temperature for a desired period of time When the mixture became viscous and more difficult to stir, the reaction mixture was diluted with NMP, cooled to <100° C., and the mixture poured in to a Waring blender containing 500 mL of a 50/50 v/v mixture of water and methanol. The resulting off-white porous solid was then isolated by filtration, and washed three times in the Waring blender with hot DI water (~90° C.) and twice with methanol with filtration between each wash. The resulting porous, off-white polymer solid was dried in a vacuum oven overnight at 100° C. The polymer solid was further analyzed by viscosity measurements, GPC and DSC to determine the molecular weight, and thermal properties (all reaction conditions and results are summarized in Tables 1 and 2).

The Following Characterizations Carried out on the Materials of the Examples are Indicated Hereinafter:

Viscosity Measurements

Intrinsic viscosity (IV) of the polymers (b-PAES) were measured in solvent mixture: $CH_2Cl_2$/trifluoroacetic acid in a volume ratio of 9/1, at a polymer concentration of 0.2 g/100 ml at 20° C. using a Cannon-Fenske viscometer tube (No. 50) according to the procedure as described by Kricheldorf and Chatti in High Performance Polymers, 2009, 21, 105-118, which is hereby incorporated by reference in its entirety.

Comparative Example 1

Said comparative example corresponds to an example described by Kricheldorf and Chatti in High Performance Polymers, 2009, 21, 105-118, the general procedure of the polycondensation reaction is described on page 106, paragraph 2.2 and in Table 2, Expt.no. 3. For the total % monomers value, it was necessary to convert the mole values values of Isosorbide (30.0 mmol) and DFDPS (30.6 mmol) into weight values, being 4.4 g and 7.8 g, respectively, the corresponding weight of DMSO and toluene were calculated using a density value of 1.1 g/mL for DMSO and 0.87 g/mL for toluene, the corresponding weights are shown in Table 1. All reaction conditions and results are summarized in Table 1.

Examples 2-9; 11-13, 15, 16 and C10, C14 and C17

All these examples are carried out according to the general procedure and the corresponding reaction conditions are shown in Table 1 and 2.

Examples C1, 2 and 3, as shown in Table 1 were carried out by using 4,4'-difluorodiphenyl sulfone (DFDPS) as dihalo (BB).

All other examples were carried out by using 4,4'-dichlorodiphenyl sulfone (DCDPS) as dihalo (BB).

TABLE 1

| | Examples N° | | | | | | | | |
|---|---|---|---|---|---|---|---|---|---|
| | C1[a] | 2 | 3 | 4 | 5 | 6 | 7 | 8 | 9 |
| | | | | | dihalo (BB | | | | |
| | DFDPS | | | | DCDPS | | | | |
| Reaction parameters: | | | | | | | | | |
| Solvent | DMSO | DMSO | Sulfolane | Sulfolane | Sulfolane | Sulfolane | Sulfolane | Sulfolane | Sulfolane |
| Cosolvent | toluene | toluene | none | none | none | none | none | none | none |
| Cosolvent/solvent (v/v) | 0.2 | 0.7 | — | — | — | — | — | — | — |
| Weight of solvent (g) | 127.4 | 38.8 | 258.7 | 56.4 | 30.2 | 23.17 | 18.0 | 9.0 | 15.0 |
| Weight isosorbide (g) | 4.4 | 5.8 | 45.0 | 4.1 | 4.1 | 4.1 | 4.1 | 2.0 | 4.1 |
| Weight dihalo (BB) | 7.8 | 10.4 | 80.0 | 8.0 | 8.1 | 8.0 | 8.0 | 4.1 | 8.0 |
| Molar Ratio dihalo (BB)/isosorbide | 1.02 | 1.02 | 1.02 | 1.0 | 1.0 | 1.0 | 1.0 | 1.0 | 1.0 |
| Molar Ratio $K_2CO_3$/isosorbide | 1.05 | 1.50 | 1.50 | 2.0 | 2.0 | 2.0 | 2.0 | 2.0 | 2.0 |

TABLE 1-continued

| | Examples N° | | | | | | | | |
|---|---|---|---|---|---|---|---|---|---|
| | C1[a] | 2 | 3 | 4 | 5 | 6 | 7 | 8 | 9 |
| | | | | | dihalo (BB) | | | | |
| | DFDPS | | | | DCDPS | | | | |
| Sum of the weight of all monomers (g) | 12.2 | 16.2 | 125.0 | 12.1 | 12.2 | 12.1 | 12.1 | 6.1 | 12.1 |
| Total % monomers | 8.7 | 29.5 | 32.5 | 17.7 | 28.8 | 34.3 | 40.2 | 40.4 | 44.6 |
| Reaction temperature (° C.) | 135-140 | 175-180 | 210 | 210 | 210 | 210 | 210 | 210 | 210 |
| Reaction time (hr) | 12 | 1.5 | 2.0 | 4.0 | 4.0 | 4.0 | 4.0 | 6.0 | 4.0 |
| Polymer properties | | | | | | | | | |
| Inherent viscosity (dL/g)* | 0.65[b] | 0.74[b] | 0.72[b] | — | — | — | — | 0.38[b] | — |
| $M_w$ (GPC) (kDa) | — | 102 | 101 | 24.6 | 41.4 | 42.7 | 55.1 | 58.0 | 50.3 |
| $T_g$ (° C.) (DSC, 20° C./min) | 245.5 | 241 | 241 | 210 | 219 | 215 | 225 | 234 | 226 |

[a]Said comparative example is an example described by Kricheldorf and Chatti in High Performance Polymers, 2009, 21, 105-118, see Table 2, Expt no. 3
[b]$CH_2Cl_2$/trifluoroacetic acid = 9/1 v/v, 20° C., 0.20 dL/g
[c]1 hour preheating at 160° C.

TABLE 2

| | Examples N° | | | | | | | | |
|---|---|---|---|---|---|---|---|---|---|
| | 7 | C10 | 11 | 12 | 13 | C14 | 15 | 16 | C17 |
| | | | | | dihalo (BB) DCDPS | | | | |
| Reaction parameters: | | | | | | | | | |
| Solvent | Sulfolane | Sulfolane | Sulfolane | Sulfolane | Sulfolane | Sulfolane | Sulfolane | Sulfolane | Sulfolane |
| Cosolvent | none | none | none | none | none | none | none | none | none |
| Weight of solvent (g) | 18.0 | 18.1 | 18.0 | 18.0 | 18.0 | 19.3 | 19.1 | 17.8 | 17.1 |
| Weight isosorbide (g) | 4.1 | 4.1 | 4.1 | 4.1 | 4.1 | 4.1 | 4.1 | 4.1 | 4.9 |
| Weight dihalo (BB) | 8.0 | 8.0 | 8.0 | 8.0 | 8.0 | 8.8 | 8.4 | 7.6 | 7.2 |
| Molar Ratio dihalo (BB)/isosorbide | 1.0 | 1.0 | 1.0 | 1.0 | 1.0 | 0.90 | 0.95 | 1.05 | 1.10 |
| Molar Ratio $K_2CO_3$/isosorbide | 2.0 | 1.2 | 1.5 | 1.75 | 3.0 | 2.0 | 2.0 | 2.0 | 2.0 |
| Sum of the weight of all monomers (g) | 12.1 | 12.1 | 12.1 | 12.1 | 12.1 | 12.9 | 12.5 | 11.7 | 12.1 |
| Total % monomers | 40.2 | 40.2 | 40.2 | 40.2 | 40.2 | 40.1 | 40.0 | 40.0 | 41.4 |
| Reaction temperature (° C.) | 210 | 210 | 210 | 210 | 210 | 210 | 210 | 210 | 210 |
| Reaction time (hr) | 4.0 | 4.0 | 4.0 | 4.0 | 4.0 | 4.0 | 4.0 | 4.0 | 4.0 |
| Polymer properties | | | | | | | | | |
| Inherent viscosity (dL/g)* | — | — | — | — | — | 0.38[a] | — | — | — |
| $M_w$ (GPC) (kDa) | 55.1 | 18.4 | 45.9 | 46.8 | 49.0 | 19.7 | 35.9 | 23.6 | 7.7 |
| $T_g$ (° C.) (DSC, 20° C./min) | 225 | 180 | 220 | 216 | 225 | 198 | 214 | 202 | 164 |

[a]$CH_2Cl_2$/trifluoroacetic acid = 9/1 v/v, 20° C., 0.20 dL/g

Example 18

"Halex" Reaction of 4,4'-dichlorodiphenyl sulfone (DCDPS) as dihalo ($B_{Cl}B_{Cl}$) Providing a Mixture of Halex Products A 50 ml-round bottom flask is charged with 1.0 g (3.484 mmol) DCDPS and 2.1 g (13.94 mmol) CsF and 3.54 g sulfolane and heated with oil bath to 210° C. The Halex reaction was carried out at this temperature for 24 hours. After completion of the reaction, a small sample of the reaction mixture was diluted with dichloromethane, and treated with activated carbon to remove color bodies and the dichloromethane solution was removed by a rotavapor. The residual product was analyzed by GC. GC analysis of the isolated product showed 90.8% of DFDPS, 6.7% of 4-chloro-4'-fluoro-diphenyl sulfone and 2.5% of DCDPS starting material.

Example 19

"Halex" Reaction of 4,4'-dichlorodiphenyl Sulfone (DCDPS) as Dihalo ($B_{Cl}B_{Cl}$) Providing a Mixture of Halex Products A 50 ml-round bottom flask is charged with 2.0 g (6.96 mmol) DCDPS and 2.1 g (13.94 mmol) CsF and 5.0 g sulfolane and heated with oil bath to 210° C. The Halex reaction was carried out at this temperature for 24 hours. After completion of the reaction, a small sample of the reaction mixture was diluted with dichloromethane, and treated with activated carbon to remove color bodies and the dichloromethane solution was removed by a rotavapor. The residual product was analyzed by GC. GC analysis of the isolated product showed 90.5% of DFDPS and 9.5% of 4-chloro-4'-fluoro-diphenyl sulfone.

Example 20

"Halex" Reaction of 4,4'-dichlorodiphenyl Sulfone (DCDPS) as Dihalo ($B_{Cl}B_{Cl}$) Providing a Mixture of Halex Products in the Presence of a PTC To a 3-neck 1L-round bottom flask equipped with a mechanical stirrer with a nitrogen inlet and outlet, was charged 253.33 g (0.8823 mol), DCDPS, 205.0 g (3.529 mol), anhydrous KF 10.86 g (4.411 mmol), 18-crown-6, and 406 g sulfolane. The mixture was gradually heated to 210° C. in oil bath and the reaction was carried out at this temperature for 20 hours. After completion of the reaction, the reaction mixture was filtered by a high pressure filter to remove an excessive salt and dichloromethane was added to the filtered solution. Later DI water was added to dichloromethane and organic layer was separated. Then the organic layer washed again with DI water to remove residual sulfolane. To the collected organic layer, some activated carbon was added to remove color and small amount of MgSO$_4$ was added to remove any traces of water. The solution was filtered and dichloromethane was removed by a rotavapor. GC analysis of the isolated product showed 88.1% of DFDPS and 11.9% of chloro-fluoro-diphenyl sulfone.

Example 21

Preparation of the Polymer (b-PAES$_{F/Cl}$) by using a Mixture of Halex Products In a 250-ml, 4-neck round bottom flask is equipped with a mechanical stirrer, a nitrogen inlet and outlet, thermocouple and a Dean-Stark trap, was charged 15.0 g isosorbide, 26.66 g Halex product of example 20 (88.1% of DFDPS and 11.9% of F-Cl-DPS), 21.28 g K$_2$CO$_3$, and 110.85 g sulfolane were charged. The mixture was slowly heated to 210° C. and the polymerization carried out at this temperature. After 5 hrs reaction time, the polymerization solution became very viscous and the reaction was stopped. The reaction mixture was cooled to 140° C., NMP solvent was added to dilute the solution and the polymerization slurry mixture was filtered. Later the filtered solution was poured into methanol/water mixture to precipitate the polymer and the isolated polymer was washed with hot water three times. The polymer subjected to a final wash with pure methanol and polymer powder was dried under vacuum at 90° C. The polymer was characterized by GPC and DSC. The GPC analysis revealed that the polymer powder has an Mw=74661 Da and the DSC showed the polymer to have a Tg of 227° C.

Example 22

Preparation of the Polymer (b-PAES$_{F/Cl}$) by using an "in-situ" Halex Reaction A 250-ml, 4-neck round bottom flask is equipped with a mechanical stirrer, nitrogen inlet and outlet, thermocouple and a Dean-Stark and 5.0 g (34.21 mmol) isosorbide, 9.923 g (34.56 mmol) DCDPS, 9.45 g (68.42 mmol) K$_2$CO$_3$, 3.969 g (68.42 mmol) KF and 28.75 g sulfolane were charged. The mixture was slowly heated to 210° C. and the polymerization carried out at this temperature. The reaction mixture was cooled to 140° C., NMP solvent was added to dilute the solution and the polymerization slurry mixture was filtered. Later the filtered solution was poured into methanol/water mixture to precipitate the polymer and the isolated polymer was washed with hot water three times. The polymer subjected to a final wash with pure methanol and polymer powder was dried under vacuum at 90° C. The polymer was characterized by GPC and DSC. The GPC analysis revealed that the polymer powder has an Mw=37355 Da and DSC showed Tg of 219° C.

The invention claimed is:

1. A process for manufacturing a poly(arylether sulfone) polymer, polymer (b-PAES), comprising reacting in a solvent mixture, the solvent mixture comprising a polar aprotic solvent, and in the presence of an alkali metal carbonate, a monomer mixture comprising:
   at least one 1,4:3,6-dianhydrohexitol, diol (AA), selected from the group consisting of isosorbide (1), isomannide (2), and isoidide (3):

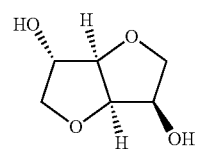

(1)

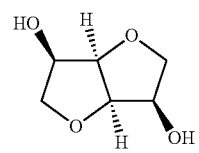

(2)

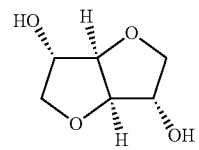

(3)

at least one dihaloaryl compound, dihalo (BB), of formula (S):

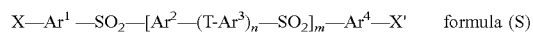

wherein
   n and m, equal to or different from each other, are independently zero or an integer of 1 to 5;
   X and X', equal to or different from each other, are halogens selected from F, Cl, Br, and I;
   each of Ar$^1$, Ar$^2$, Ar$^3$ and Ar$^4$, equal to or different from each other and at each occurrence, is an aromatic moiety;
   T is a bond or a divalent group optionally comprising one or more than one heteroatom;
   optionally, at least one dihydroxyl compound, diol (A'A'), different from the diol (AA);
   optionally, at least one dihaloaryl compound, dihalo (B'B'), different from the dihalo (BB);
   optionally, at least one hydroxyl-halo compound, hydrohalo (A'B'); with the proviso that the overall amount of halo-groups and hydroxyl-groups of the monomers of the monomer mixture has a molar ratio of 0.95 to 1.05, so as to obtain the polymer (b-PAES), and wherein the reaction is carried out at a total % monomer mixture concentration, total % monomers, equal to or more than 15% and less than 70%, with respect to the combined weight of monomer mixture and solvent mixture, and the amount of the alkali metal carbonate ranges from 1.3 to 4.0, when expressed by a ratio of equivalents of alkali metal (M) per equivalent of hydroxyl group (OH) [eq. (M)/eq. (OH)], and the poly(arylether sulfone) polymer, polymer (b-PAES), comprises 70 mol. % or more of recurring units ($R_b$) selected from the group consisting of:

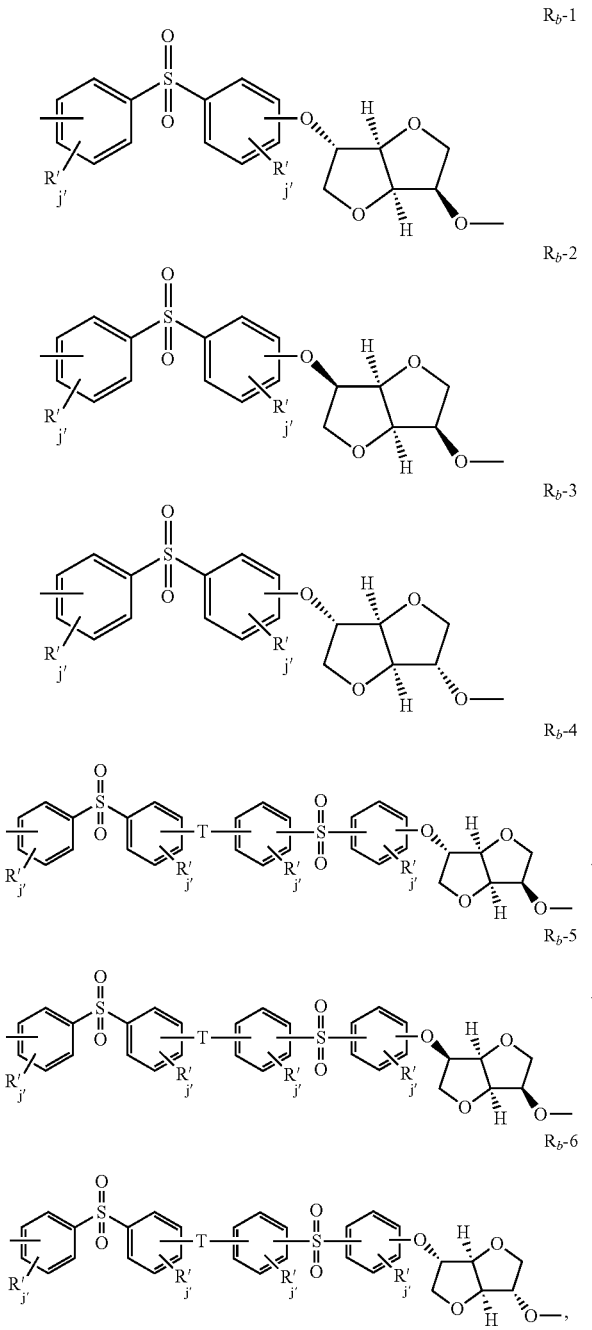

and mixtures thereof,
wherein:
each R' is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;

j' is zero or an integer of 1 to 4; and

T is a bond or a divalent group optionally comprising one or more than one heteroatom.

2. The process according to claim 1, wherein the dihalo (BB) are those having formula (S'-1) to (S'-3):

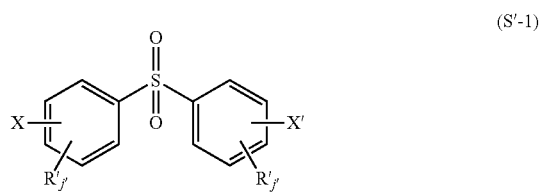

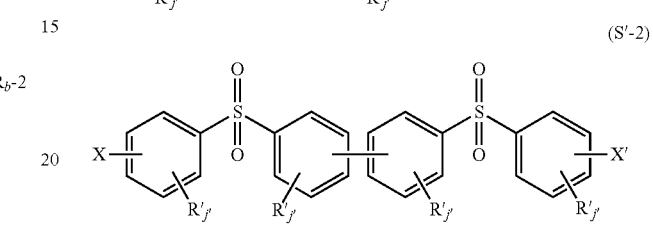

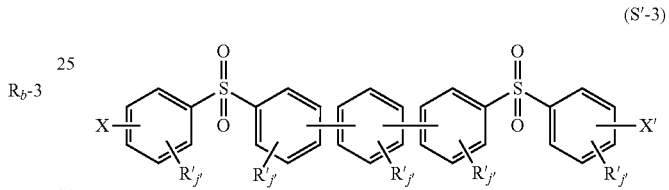

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;

j' is zero or is an integer from 0 to 4; and

X and X', equal to or different from each other, are independently a halogen atom.

3. The process according to claim 1, wherein the monomer mixture comprises a dihaloaryl compound obtained by reaction of a precursor dihaloaryl compound of formula (S), wherein X, X' is Cl, precursor dihalo ($B_{cl}B_{cl}$), with at least one fluorinating agent.

4. The process according to claim 1, wherein the monomer mixture contains at least one diol (A'A') different from the diol (AA), the diol (A'A') is selected from the group consisting of compounds of formula (O):

$$HO-Ar^5-(T'-Ar^6)_n-O-H \qquad \text{formula (O)}$$

wherein:
n is zero or an integer of 1 to 5;
each of $Ar^5$ and $Ar^6$, equal to or different from each other and at each occurrence, is an aromatic moiety of formula:

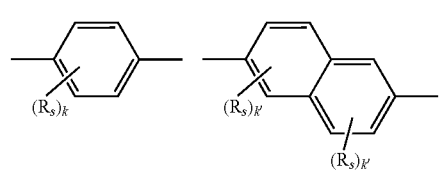

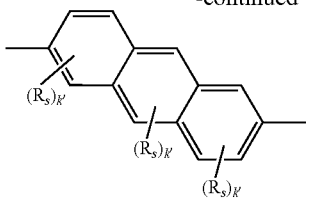

wherein: each $R_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and k is zero or an integer of 1 to 4;

k' is zero or an integer of 1 to 3; and

T' is a bond or a divalent group optionally comprising one or more than one heteroatom.

5. The process according to claim 1, wherein the monomer mixture comprises at least one dihalo (B'B') different from the dihalo (BB), the dihalo (B'B') is of formula:

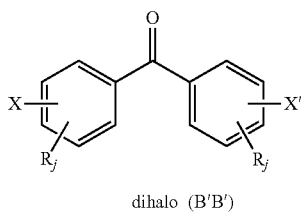

dihalo (B'B')

wherein:
each of R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;

j is zero or is an integer from 1 to 4; and

X and X', equal to or different from each other, are independently a halogen atom.

6. The process according to claim 1, wherein the polar aprotic solvent is selected from a group consisting of dimethylsulfoxide, dimethylsulfone, diphenylsulfone, diethylsulfoxide, diethylsulfone, diisopropylsulfone, tetrahydrothiophene-1,1-dioxide, tetrahydrothiophene-1-monoxide, and mixtures thereof.

7. The process according to claim 1, wherein the total % monomers is in a range from 35% - 42%.

8. The process according to claim 1, wherein the alkali metal carbonate is selected from the group consisting of sodium carbonate, potassium carbonate, rubidium carbonate, and cesium carbonate.

9. A polymer (b-PAES$_{cl}$) prepared by the process according to claim 1, wherein the polymer (b-PAES$_{cl}$) is derived from halo compounds, including dihalo (BB) and/or in combination of optional dihalo (B'B'), wherein X and X' is Cl.

10. A polymer (b-PAES$_{F/cl}$) prepared by the process according to claim 1.

11. A shaped article manufactured from the polymer (b-PAES) prepared according to claim 1 selected from the group consisting of melt processed films, solution processed films, melt process monofilaments and fibers, solution processed monofilaments, hollow fibers and solid fibers, and injection and compression molded objects.

12. A shaped article manufactured from the polymer (b-PAES) prepared according to claim 1 selected from membranes for bioprocessing, membranes for medical filtrations, membranes for food and beverage processing, membranes for waste water treatment, and membranes for industrial process separations involving aqueous media.

13. A shaped article manufactured from the polymer (b-PAES) prepared according to claim 1 selected from films and sheets.

14. The process according to claim 1, wherein the X and X', equal to or different from each other, are halogens selected from Cl and F.

15. The process according to claim 1, wherein T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula :

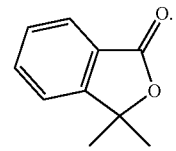

16. The process according to claim 1, wherein the alkali metal carbonate is selected from sodium carbonate and potassium carbonate.

17. The shaped article according to claim 12, wherein the membrane for medical filtrations are hemodialysis membranes.

18. A method for manufacturing a membrane, film, sheet, or three-dimensional moulded part comprising processing the polymer (b-PAES) prepared by the process of claim 1 into the membrane, the film, the sheet, or the three-dimensional moulded part.

19. The process according to claim 1, wherein the poly (arylether sulfone) polymer, polymer (b-PAES), comprises 85 mol. % or more of recurring units ($R_b$).

* * * * *